Patented Dec. 19, 1950

2,534,814

UNITED STATES PATENT OFFICE 2,534,814

PRODUCTION OF ASBESTOS-RUBBER COMPOSITIONS

George D'Olier, Devon, Conn., assignor to Raybestos-Manhattan, Inc., Passaic, N. J., a corporation of New Jersey No Drawing. Application August 7, 1948, Serial No. 43,160

8 Claims. (Cl. 260—41.5)

This invention relates to the production of asbestos-rubber material compositions and is characterized by a novel method of employing rubber material latices.

More particularly, the present invention is directed to the production of compressed asbestos sheet and friction material by the generally conventional process of forming a mix of fibrous asbestos, rubber material, rubber solvent and conventional fillers, and forming and building the material up into sheets on a conventional apparatus known as a compressed asbestos sheeter. As is well known, such apparatus comprises two rolls constructed similarly to a rubber mill which has rolls of two different diameters and which run at even speeds. The larger roll, which is the build-up roll, is heated to a temperature of between about 240° F. and 270° F., and the smaller roll is run cold. The stock at "sheeter consistency" is fed to the nip of the rolls and builds up on the large hot roll, the speed of which may vary from four to seven revolutions per minute, picking up between .0005 and .001 inch of material per revolution. A tremendous pressure is applied by the cold roll which is continuously backed off during the build-up operation to the desired thickness of the sheet, which may, for example, be up to onehalf inch. The rolls are provided with a hood or enclosure having suction means for drawing off evaporated solvents or other volatilized matter. The material after being built up to desired thickness is stripped off in sheets which have a density of approximately 85% of the theoretical density.

Heretofore in processes of the foregoing class, it has been the practice to form the mix by a conventional "dough process" which comprised the combining of rubber (natural or synthetic) with solvent therefor to form a heavy dough requiring three to four hours of mixing or about twenty-four hours of soaking or a combination of both, followed by mixing of this dough with the asbestos and other compounding materials. This dough process, in addition to being timeconsuming, requires heavy-duty mixers on which there is considerable wear and tear, has high power requirement, entails considerable fire hazard and other undesirable features. In the production of friction materials entailing the incorporation of various friction particles by the dough process, the friction particles roll off the surface of the friction material and are of no value. Further, there is much left to be desired as to uniformity or homogeneity in this dough process, and particularly from batch to batch.

Therefore, it is an object of the present invention to employ rubber material in the foregoing class of compositions and in the same general method, but in the form of a rubber latex with the result that this general sheeter method can be employed for the production of friction materials in addition to the well-known sheet packing materials; material, labor and other handling costs are reduced; fire hazards minimized; less binder is required; and overall products of relatively greater strength and more uniform character may be obtained.

Although the employment of rubber latex in combination with fibrous asbestos has been practiced, it is well known that on bringing the two together, coagulation of the latex by the asbestos begins at once, and unless some special treatment is provided, not only is the rubber prevented from becoming uniformly and evenly distributed over and with the asbestos, but the asbestos becomes knotted and balled up, which is most detrimental. Methods have heretofore been proposed for preventing or delaying the coagulation of rubber latex by asbestos for use in other processes, such as by pretreating the asbestos or by adding colloids or other protectives to the latex, as taught, for example, by Wescott United States Patent No. 1,907,634.

It is an object of the present invention to prevent coagulation of rubber latex in combination with asbestos in a novel manner. More specifically and in accordance with the present invention, I am able to employ rubber latex in place of the rubber normally employed in the general composition and sheeting process hereinbefore described without the necessity for pretreating the asbestos with foreign materials and without the necessity for adding an external protective to the latex. I merely accomplish the prevention of latex coagulation by employing the same rubber solvents as would usually be employed in the previously described dough processes, but in a different sequence.

Thus, in accordance with the present invention, I first add to the asbestos conventional rubber solvent to thoroughly wet it and to intimately distribute it over and with the fibers before adding the latex, which effectively serves to prevent coagulation and prevents balling and knotting up of the asbestos when the latex is added thereto.

In the practice of the present invention, I may employ either natural rubber or various known, so-called synthetic rubbers, such as, for example, GR-S (butadiene-styrene copolymer), Buna N (butadiene-acrylonitrile copolymer), neoprene or polychloroprene (2-chloro-1,3 butadiene) and the like butalastic polymers, all of which I have collectively designated herein and in the appended claims as "rubber material." The solvents employed are also the conventional rubber solvents such as gasoline, mineral spirits, petroleum naphtha, aromatic solvents such as toluene, or other known solvents such as methyl ethyl ketone, the latter being effectively employed alone or in combination with aromatics for Buna N. The latices may likewise be the normally occurring kinds or artificial dispersions, and they may have a solids content range of from about 28% to about 60%. For forming sheeter products, it is preferable to use latices of relatively high solids content. The other ingredients used in forming compositions of the class described are asbestos fiber from the papermaking grades to the shorter spinning grades, curing ingredients such as sulphur, accelerators and anti-oxidants, inert fillers, friction particles, etc.

In preparing a mixture suitable for use in the process and by the roll means hereinbefore described, I may employ suitable mixing or kneading means, such as of the spike mixing type or one equipped with paddles such as used in making bread dough.

The following are examples of formulations for the purpose of illustration which I may employ:

*Sheet packing formula*

A

| | Parts by weight |
|---|---|
| GR-S latex solids | 100 |
| Natural rubber | 36 |
| Curing ingredient and inert filler | 23 |
| Asbestos fiber | 750 |
| Petroleum naphtha solvents | 900 |

B

| | |
|---|---|
| Neoprene latex solids | 100 |
| Curing ingredients and fillers | 7 |
| Asbestos fiber | 360 |
| Aromatic solvent | 530 |

*Friction material formula*

A

| | Parts by weight |
|---|---|
| GR-S latex solids | 100 |
| Curing ingredients and fillers | 250 |
| Friction particles | 50 |
| Asbestos fiber | 270 |
| Petroleum naphtha solvent | 560 |

B

| | |
|---|---|
| Buna N latex solids | 100 |
| Resin | 30 |
| Curing ingredients and fillers | 640 |
| Asbestos fiber | 510 |
| Aromatic and methyl ethyl ketone solvents | 760 |

The mixing process may be carried out as follows: All of the asbestos and sufficient solvent is first added to the kneader, although these may be added in successive increments, so as to thoroughly coat and mix the asbestos fibers with the solvent. The curing ingredients, inert fillers, and friction particles, when making friction material, are then added and mixed, and if desired some of the solvent may be here added. Thereafter, the latex is added and mixed. If desired, a minor portion of the total solvent may be added after introduction of the latex to provide "sheeter consistency." The mix is then fed to the rolls of a compressed asbestos sheeter and built up thereon to desired thickness, as previously described herein.

The mix sequence prevents coagulation of the latex by the asbestos, permits easier and more uniform distribution of the rubber material binder with the asbestos, ready and quick access of the solvent to the rubber particles and lowers normal solvent requirement, and not only facilitates the operation as a whole but permits production of products of greater strength and more uniform character than formerly, and in addition the improved process now permits introduction and retention of friction particles so as to make possible production of friction materials, such as brake linings and clutch facings, by this method in addition to asbestos sheet, sheet packing, etc.

I claim as my invention:

1. In a method of forming asbestos-rubber compositions and wherein rubber is admixed with fibrous asbestos only in the form of a latex of a rubbery material from the group consisting of natural rubber, butadiene-styrene copolymer, butadiene-arcylonitrile copolymer and polychloroprene, the steps which comprise inhibiting the coagulation of said latex by first thoroughly coating and admixing the asbestos fibers with a solvent for said rubbery material and then adding and admixing said latex therewith.

2. In a method of forming compressed asbestos sheet material and wherein rubber is admixed with fibrous asbestos only in the form of a latex of a rubbery material from the group consisting of natural rubber, butadiene-styrene copolymer, butadiene-acrylonitrile copolymer and polychloroprene, the steps which comprise thoroughly coating and admixing the asbestos fibers with a solvent for said rubbery material, further admixing therewith inert fillers and curing agents, and then adding and admixing said latex therewith.

3. In a method of forming compressed asbestos sheet friction material and wherein rubber is admixed with fibrous asbestos only in the form of a latex of a rubbery material from the group consisting of natural rubber, butadiene-styrene copolymer, butadiene-acrylonitrile copolymer and polychloroprene, the steps which comprise thoroughly coating and admixing the asbestos fibers with a solvent for said rubbery material, further admixing therewith inert fillers, friction particles and curing agents, and then adding and admixing said latex therewith.

4. In a method of producing compressed asbestos sheet material by buliding up layers of a kneaded mixture of sheeter consistency comprising fibrous asbestos, fillers, rubbery material and solvent therefor on the heated roll of a compressed asbestos sheeter, and wherein the rubbery material is employed wholly in the form of a latex of a rubbery material from the group consisting of natural rubber, butadiene-styrene copolymer, butadiene-acrylonitrile copolymer and polycholoroprene, the steps which comprise forming said mixture by intimately mixing and thoroughly coating said asbestos fibers with a solvent for said rubbery material, further admixing therewith inert fillers and curing agents for said rubbery material, and then adding and admixing said latex therewith.

5. In a method of forming asbestos-rubber compositions and wherein rubber is admixed with fibrous asbestos only in the form of a latex of natural rubber, the steps which comprise inhibiting the coagulation of said latex by first thoroughly coating and admixing the asbestos fibers with a solvent for said rubbery material and then adding and admixing said latex therewith.

6. In a method of forming asbestos-rubber compositions and wherein rubber is admixed with fibrous asbestos only in the form of a latex of butadiene-styrene copolymer, the steps which comprise inhibiting the coagulation of said latex by first thoroughly coating and admixing the asbestos fibers with a solvent for said rubbery material and then adding and admixing said latex therewith.

7. In a method of forming asbestos-rubber compositions and wherein rubber is admixed with fibrous asbestos only in the form of a latex of butadiene-acrylonitrile copolymer, the steps which comprise inhibiting the coagulation of said latex by first thoroughly coating and admixing the asbestos fibers with a solvent for said rubbery material and then adding and admixing said latex therewith.

8. In a method of forming asbestos-rubber compositions and wherein rubber is admixed with fibrous asbestos only in the form of a latex of polychloroprene, the steps which comprise inhibiting the coagulation of said latex by first thoroughly coating and admixing the asbestos fibers with a solvent for said rubbery material and then adding and admixing said latex therewith.

GEORGE D'OLIER.

REFERENCES CITED

The following references are of record in the file of this patent:

UNITED STATES PATENTS

| Number | Name | Date |
|---|---|---|
| 1,499,863 | Frahm | July 1, 1924 |
| 1,913,328 | Rollman et al. | June 6, 1933 |
| 2,061,918 | Nanfeldt | Nov. 24, 1936 |
| 2,381,248 | Bascom | Aug. 7, 1945 |
| 2,440,299 | Rostler | Apr. 27, 1948 |